US011958426B2

(12) United States Patent
Yepez et al.

(10) Patent No.: US 11,958,426 B2
(45) Date of Patent: Apr. 16, 2024

(54) SEAT RESTRAINT SYSTEM AND METHOD FOR RIDE VEHICLE

(71) Applicant: Universal City Studios LLC, Universal City, CA (US)

(72) Inventors: Sabrina Andreina Yepez, Orlando, FL (US); Rachel Wilcox, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 112 days.

(21) Appl. No.: 17/852,055

(22) Filed: Jun. 28, 2022

(65) Prior Publication Data

US 2023/0365087 A1 Nov. 16, 2023

Related U.S. Application Data

(60) Provisional application No. 63/340,280, filed on May 10, 2022.

(51) Int. Cl.
*B60R 21/02* (2006.01)
*B60R 21/00* (2006.01)

(52) U.S. Cl.
CPC ...... *B60R 21/02* (2013.01); *B60R 2021/0097* (2013.01)

(58) Field of Classification Search
CPC .............. B60R 21/02; B60R 2021/022; B60R 2021/0097
See application file for complete search history.

(56) References Cited

U.S. PATENT DOCUMENTS

| 4,770,468 | A | * | 9/1988 | Shubin ................. | B60N 2/2875 D6/333 |
| 7,914,384 | B2 | * | 3/2011 | Roodenburg ............ | A63G 7/00 472/43 |
| 8,303,043 | B2 | | 11/2012 | Humbert | |
| 8,491,058 | B2 | | 7/2013 | Siegel | |
| 9,751,022 | B1 | * | 9/2017 | Fram ........................ | B61B 3/02 |
| 10,315,619 | B2 | * | 6/2019 | Farooq ................... | B60R 22/48 |
| 2004/0092323 | A1 | * | 5/2004 | Clerx ....................... | A63G 7/00 472/43 |

(Continued)

FOREIGN PATENT DOCUMENTS

| JP | 4569684 | 10/2010 | |
| WO | WO-2009005337 A1 * | 1/2009 | ........... B60R 21/026 |

OTHER PUBLICATIONS

PCT/US2023/021492 International Search Report and Written Opinion dated Sep. 5, 2023.

*Primary Examiner* — Timothy J Brindley
(74) *Attorney, Agent, or Firm* — Fletcher Yoder, PC

(57) ABSTRACT

A seat restraint system includes an over-the-shoulder (OTS) restraint and a lap restraint. The lap restraint includes a lap restraint enclosure defining an interior space and having an opening through the lap restraint enclosure, a track disposed in the interior space, and a movable assembly engaged with the track and configured to move along the track. The movable assembly includes an extension from the interior space, through the opening, and to an external space outside of the lap restraint enclosure. The movable assembly also includes engagement feature coupled to the extension and configured to be coupled to the OTS restraint in an engaged configuration.

20 Claims, 3 Drawing Sheets

(56) References Cited

U.S. PATENT DOCUMENTS

| | | |
|---|---|---|
| 2010/0307288 A1* | 12/2010 | Lubman .................. B60R 21/02 |
| | | 74/577 M |
| 2015/0251619 A1 | 9/2015 | Sutherland |
| 2018/0022241 A1 | 1/2018 | Jewkes |
| 2019/0135225 A1 | 5/2019 | Kim |
| 2019/0184935 A1* | 6/2019 | Blum ...................... B60R 22/48 |
| 2020/0346603 A1 | 11/2020 | Freedman et al. |
| 2020/0398781 A1 | 12/2020 | Faruque et al. |
| 2021/0229613 A1 | 7/2021 | Wilcox |

* cited by examiner

SEAT RESTRAINT SYSTEM AND METHOD FOR RIDE VEHICLE

CROSS-REFERENCE TO RELATED APPLICATIONS

This application claims priority to and the benefit of U.S. Provisional Application No. 63/340,280, entitled "SEAT RESTRAINT SYSTEM AND METHOD FOR RIDE VEHICLE," filed May 10, 2022, which is hereby incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Entertainment venues, such as theme parks and amusement parks, have been created to provide guests with various immersive experiences. These entertainment venues may include various movable ride vehicles employed in rides (e.g., rollercoasters), show attractions, games, and the like. Traditional systems may employ restraints configured to restrain a guest within a seat of the ride vehicle as the ride vehicle is in motion. Unfortunately, restraints in traditional systems may be uncomfortable, complex to operate, complex to manufacture, and/or expensive to manufacture. Restraints in other traditional systems, such as automobiles, may include the same or similar drawbacks. Accordingly, it is now recognized that improved seat restraints are desired.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from embodiments set forth below.

In an embodiment, a seat restraint system includes an over-the-shoulder (OTS) restraint and a lap restraint. The lap restraint includes a lap restraint enclosure defining an interior space and having an opening through the lap restraint enclosure, a track disposed in the interior space, and a movable assembly engaged with the track and configured to move along the track. The movable assembly includes an extension from the interior space, through the opening, and to an external space outside of the lap restraint enclosure. The movable assembly also includes an engagement feature coupled to the extension and configured to be coupled to the OTS restraint in an engaged configuration.

In an embodiment, a lap restraint of a seat restraint system includes a lap restraint enclosure defining an interior space and having a slot through a surface of the lap restraint enclosure, a track disposed in the interior space, and a movable assembly engaged with the track and configured to move along the track. The movable assembly includes an extension extending from the interior space, through the slot in the surface of the lap restraint enclosure, and to an external space outside of the lap restraint enclosure. The movable assembly also includes an engagement feature coupled to the extension and configured to be coupled to an over-the-shoulder (OTS) restraint of the seat restraint system.

In an embodiment, a ride vehicle includes a seat configured to receive a passenger, an over-the-shoulder (OTS) restraint, and a lap restraint. The lap restraint includes a track, a movable assembly engaged with the track and configured to move along the track, and an extension coupled to the movable assembly. The extension includes an engagement feature configured to couple to the OTS restraint and decouple from the OTS restraint.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
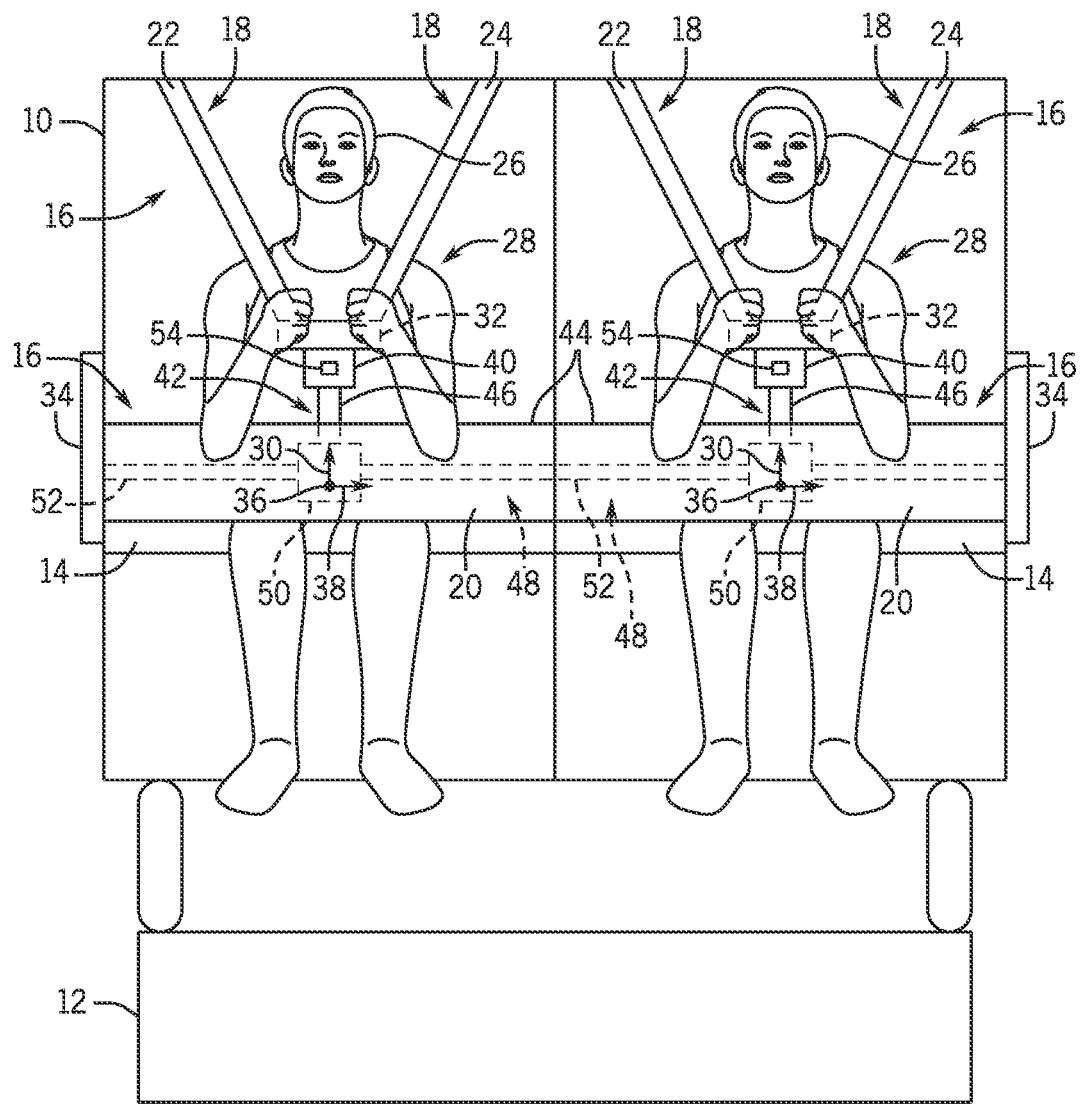
FIG. 1 is a schematic front view of a ride vehicle on a track, the ride vehicle having a seat and a seat restraint system, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a seat restraint system of a ride vehicle. The ride vehicle including the seat restraint system may be employed in a ride (e.g., rollercoaster) and/or a show attraction at an entertainment venue. The seat restraint system operates to restrain a passenger within a seat of the ride vehicle, for example, while the ride vehicle is in motion. The seat restraint system may include an over-the-shoulder (OTS) restraint configured to fit over the passenger's shoulders, and a lap restraint configured to extend across a lap area of the passenger. The OTS restraint and the lap restraint may coordinate together in accordance with present embodiments to provide securement of the passenger (e.g., upper and lower passenger body securement beneficial for certain ride types). The lap restraint includes features that facilitate coupling with the OTS restraint in different positions or configurations to facilitate coordinated restraint by the OTS and lap restraints for passengers of variable sizes.

The OTS restraint may include a first strap or bar that fits over a first shoulder of the passenger and a second strap or bar that fits over a second shoulder of the passenger, such that the passenger's head is positioned between the first strap or bar and the second strap or bar. The first strap or bar and the second strap or bar may be rigid or semi-rigid, and may include a foam or foam-like material that is comfortable when contacting the passenger. In an embodiment, the OTS restraint is vertically actuated from a first OTS restraint position (e.g., elevated position) in which the OTS restraint is lifted away from (e.g., positioned above) the passenger, and a second OTS restraint position (e.g., lowered position) in which the OTS restraint is lowered over the passenger such that the passenger's head is positioned between the first strap or bar and the second strap or bar.

In accordance with the present disclosure, the seat restraint system includes a lap restraint (e.g., a lap bar) configured to engage the OTS restraint to restrain the passenger within the seat of the ride vehicle. In an embodiment, the lap restraint is actuated (e.g., horizontally actuated, actuated side-to-side) between a first lap restraint position (e.g., retracted position) that facilitates the passenger entering the seat of the ride vehicle, and a second lap restraint position (e.g., extended position) configured to enable an engagement between the lap restraint and the OTS restraint. Indeed, the lap restraint may include an engagement feature, such as a buckle or latch, configured to engage an additional engagement feature of the OTS restraint, such as a latch or buckle. The lap restraint may also engage another aspect of itself or a body of the ride vehicle for additional securement. Because various passengers that occupy the seat in the ride vehicle over time may vary in size and/or shape, a position (e.g., horizontal position) of the engagement feature corresponding to the lap restraint may vary for each passenger. Thus, in accordance with the present disclosure, the lap restraint includes aspects configured to enable movement of the engagement feature relative to the passenger in the seat and/or another feature of the lap restraint.

In an embodiment, the lap restraint includes a lap restraint enclosure defining an interior space. For example, the lap restraint enclosure may be an interior of a hollow lap bar. A track, a movable assembly engaged with the track and configured to move along the track, and a first portion of an extension included in the movable assembly are disposed within the interior space defined by the lap restraint enclosure. Further, the lap restraint enclosure includes a surface having an opening or slot therethrough. In other words, the opening or slot defines a passage, via the enclosure, from an exterior of the lap restraint to the interior space. The extension of the movable assembly extends from the interior space, through the opening or slot in the surface of the lap restraint enclosure, and into an external space outside of the lap restraint enclosure. Thus, a second portion of the extension is disposed in the external space, and includes the engagement feature (e.g., the buckle or latch) of the lap restraint disposed therein or coupled thereto.

In an embodiment, the movable assembly includes a ring surrounding the track, where the above-described extension and at least one wheel (e.g., three wheels, six wheels, twelve wheels) are coupled to the ring. The wheel(s) engage the track and enable movement of the movable assembly relative to and along the track. In an embodiment employing three wheels, for example, a first wheel is disposed at a first circumferential position on the ring, a second wheel is disposed at a second circumferential position on the ring, and a third wheel is disposed at a third circumferential position on the ring. The first circumferential position is spaced from the second circumferential position by a first circumferential distance, the second circumferential position is spaced from the third circumferential position by a second circumferential distance, and the third circumferential position is spaced from the first circumferential position by a third circumferential distance. The first circumferential distance, the second circumferential distance, and the third circumferential distance may be substantially equal (e.g., within engineering tolerances). In this way, the wheels of the movable assembly are equidistant with each other in a circumferential direction. A load on the movable assembly may be stabilized and/or movement of the movable assembly relative to the track may be improved by the above-described features.

It should be noted that the use of the term "ring" does not necessarily imply a circular shape, or even a closed shape. Indeed, the ring may include a square shape, a rectangular shape, a triangular shape, an oval shape, or any other shape. Geometric terms as used herein and with reference to certain of the disclosed components should not be interpreted as meaning that the shapes of said components strictly adhere to mathematical properties defining the geometric terms. Further, while the ring may fully encircle the track in certain embodiments, in other embodiments the ring may not fully encircle the track. For example, the ring may include a break between two of the wheels of the movable assembly. These and other features will be described in more detail with reference to the drawings.

In an embodiment, a locking mechanism is employed in the lap restraint with respect to the movable assembly. For example, the locking mechanism is actuatable between an unlocked position in which the movable assembly is permitted to move along the track, and a locked position in which movement of the movable assembly along the track is blocked. Accordingly, the passenger in the seat of the ride vehicle (or another person, such as an operator of the ride vehicle) may move the movable assembly along the track, via the extension protruding from the opening or slot in the lap restraint enclosure, until the engagement feature of the lap restraint is at a centered position for the passenger. After centering the engagement feature of the lap restraint, the engagement feature of the lap restraint can be coupled to the engagement feature of the OTS restraint. Further, the locking mechanism can be actuated to the locked position such that movement of the movable assembly (e.g., after the lap restraint and OTS restraint are coupled) is blocked. These and other features are described in detail below.

Continuing now with the drawings, FIG. 1 is a schematic view of an embodiment of a ride vehicle 10 on a ride track 12, the ride vehicle 10 having a seat 14 and a seat restraint system 16. In the illustrated embodiment, the ride vehicle 10 includes two instances of the seat 14 and the seat restraint system 16, although any number of instances of the seat 14 and the seat restraint system 16 may be employed. For purposes of clarity, the seat 14 and the seat restraint system 16 are referenced in the singular below and with respect to the drawings.

As shown, the seat restraint system 16 includes an over-the-shoulder (OTS) restraint 18 and a lap restraint 20. The OTS restraint 18 includes a first member 22 (e.g., bar, strap, or belt) and a second member 24 (e.g., bar, strap, or belt). The first member 22 and the second member 24 are spaced from each other such that a head 26 of a passenger 28 can be positioned between the first member 22 and the second member 24. Further, the first member 22 and the second member 24 may be rigid and/or semi-rigid for purposes of restraining the passenger 28, and may include an exterior foam, foam-like, or padded material that is comfortable when contacting the passenger 28. In the illustrated embodiment, the OTS restraint 18 is disposed in an engaged configuration, in that the OTS restraint 18 is pulled down over the passenger 28 and engaged with the lap restraint 20. The OTS restraint 18 is also movable along a first axis 30 or in a plane (e.g., vertical plane) formed by the first axis 30 and a second axis 36. Accordingly, the OTS restraint 18 is actuatable (e.g., vertically actuatable, actuatable from top-to-bottom) between the engaged configuration (or lowered position) and a disengaged configuration (or elevated position) in which the OTS restraint 18 is lifted over and/or above the head 26 of the passenger 28. The OTS restraint 18 also includes an engagement feature 32, such as a plate, a buckle, or a latch, configured to engage the lap restraint 20, as described in detail below.

In the illustrated embodiment, the lap restraint 20 is coupled to a base 34 of the ride vehicle 10. Further, the lap restraint 20 is actuatable, relative to the base 34, along a third axis 38 or within a plane (e.g., horizontal plane) defined by the second axis 36 and the third axis 38. Other configurations and corresponding actuation are also possible. For example, the lap restraint 20 may be angled such that it is actuated through a plane forming an angle with the plane defined by the second axis 36 and the third axis 38. Additionally or alternatively, a path of actuation of the lap restraint 20 may not be curvilinear. Indeed, the lap restraint 20 may include a curvilinear shape and actuation of the lap restraint 20 may follow a corresponding curvilinear path. Further, the curvilinear path of the lap restraint 20 may vary based on a size of the passenger 28 over which the lap restraint 20 is actuated. In any case, the lap restraint 20 may be actuated side-to-side (e.g., horizontally), whereas the OTS restraint 18 may be actuated top-to-bottom (e.g., vertically). Put differently, actuation of the lap restraint 20 may be transverse to actuation of the OTS restraint 18.

In some embodiments, the base 34 includes a receptacle configured to receive a portion of the lap restraint 20 as the lap restraint 20 is actuated from an engaged configuration (e.g., over a lap of the passenger 28 and/or engaged with the OTS restraint 18) to a disengaged configuration. The receptacle may thus house the lap restraint 20 (or a portion thereof) when not in use for securing the passenger 28. Certain instances of the present disclosure refer to a retracted position of the lap restraint 20 (e.g., where the passenger 28 is permitted to enter the seat 14) and an extended position of the lap restraint 20 (e.g., where the lap restraint 20 can be engaged with the OTS restraint 18). Additionally or alternatively, a hinge may be employed at the base 34 and configured to enable the above-described horizontal actuation of the lap restraint 20. Accordingly, the lap restraint 20 may be actuated in varying amounts depending on the size and/or shape of the passenger 28 disposed in the seat 14. For at least these reasons, a position of an engagement feature 40 of the lap restraint 20 for coupling with the OTS restraint 18, such as a plate, a latch, or a buckle, may vary based on the size and/or shape of the passenger 28, and the corresponding degree or amount the lap restraint 20 is actuated to span the passenger 28.

In accordance with the present disclosure, the lap restraint 20 includes a movable assembly 42 configured to enable movement of the engagement feature 40 of the lap restraint 20 relative to a lap restraint enclosure 44, such that the engagement feature 40 can be centered relative to the passenger 28. The movable assembly 42 may include, for example, the engagement feature 40 and an extension 46 extending from the engagement feature 40, through a slot or opening (not shown) in the lap restraint enclosure 44, and into to an interior space 48 defined by the lap restraint enclosure 44. The movable assembly 42 may also include a wheel assembly 50 coupled to the extension 46 and disposed within the interior space 48. In the illustrated embodiment, the wheel assembly 50 engages a track 52 disposed in the interior space 48 of the lap restraint enclosure 44, such that the wheel assembly 50 can be moved along the track 52. For example, the passenger 28 (or another person, such as an operator of the ride vehicle 10), can move the wheel assembly 50 along the track 52 by pulling the extension 46 and/or the engagement feature 40 coupled to the extension 46.

Once the engagement feature 40 of the lap restraint 20 is at a central position for the passenger 28, the passenger 28 (or another person, such as an operator of the ride vehicle 10) can couple the engagement feature 40 of the lap restraint 20 with the engagement feature 32 of the OTS restraint 18. In an embodiment, a button 54 disposed on the engagement feature 40 of the lap restraint 20 may be employed to activate a release mechanism to disengage the engagement feature 40 of the lap restraint 20 from the engagement feature 32 of the OTS restraint 18. In another embodiment, the button 54 and associated release mechanism are disposed on the engagement feature 32 of the OTS restraint 18, or a different disengagement feature may be employed.

Further, it should be noted that, in some embodiments, the OTS restraint 18 and/or the lap restraint 20 may include additional features (e.g., a ratchet assembly, a hydraulic assembly, a pneumatic assembly, etc.) that enable actuation of the OTS restraint 18 and/or the lap restraint 20 (e.g., in the various axes 30, 36, 38, as previously described). In some embodiments, said additional features (e.g., ratchet assembly, hydraulic assembly, pneumatic assembly, etc.) act to maintain the positions of the lap restraint 20 and the OTS restraint 18 in the engaged configuration. Indeed, coupling of the engagement feature 40 of the lap restraint 20 and the engagement feature 32 of the OTS restraint 18 may serve as redundancy with the above-described additional features.

As will be appreciated in view of later drawings, the lap restraint 20 may include a locking mechanism configured to lock the movable assembly 42 of the lap restraint 20 in place. For example, the locking mechanism may lock the lap restraint 20 in place once the movable assembly 42 is centered relative to the passenger 28 and/or the engagement feature 40 of the lap restraint 20 is coupled with the engagement feature 32 of the OTS restraint 18. In some embodiments, the locking mechanism may be activated in response to a coupling of the engagement feature 40 of the lap restraint 20 and the engagement feature 32 of the OTS restraint 18. Further, when the button 54 is pressed to disengage the lap restraint 20 and the OTS restraint 18, the locking mechanism may be actuated to an unlocked position such that movement of the movable assembly 42 is permitted. In general, the above-described features are configured to enable the passenger 28 to easily and comfortably move the engagement feature 40 of the lap restraint 20 such that the engagement feature 40 can be coupled with the engagement feature 32 of the OTS restraint 18.

Figure 2:
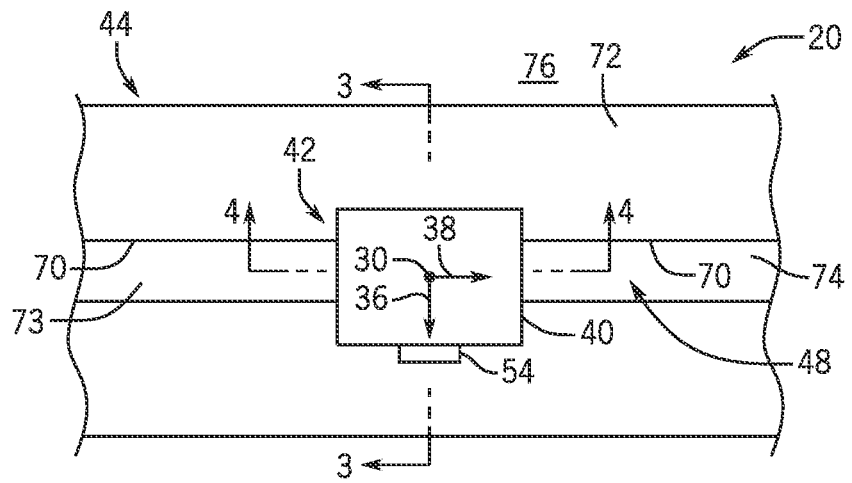
FIG. 2 is a top-down view of a lap restraint of the seat restraint system of FIG. 1, in accordance with an aspect of the present disclosure.

FIG. 2 is a top-down view of an embodiment of the lap restraint 20 of the seat restraint system 16 of FIG. 1. In the illustrated embodiment, the lap restraint 20 includes the lap restraint enclosure 44 defining the interior space 48 of the lap restraint 20. The interior space 48 can be seen in FIG. 2 through the slot 70 (or opening) disposed in a surface 72 (e.g., upper surface) of the lap restraint enclosure 44. The slot 70 enables movement of the movable assembly 42 along the third axis 38. That is, the slot 70 provides a passage along the third axis 38 through the surface 72 of the lap restraint enclosure 44 for the extension 46, which is illustrated in FIG. 1 and disposed behind (or underneath) the engagement feature 40 in the illustrated perspective of FIG. 2. In some embodiments, sliding plates 73, 74 are disposed in the slot 70 and configured to slide (e.g., telescope) in response to movement of the movable assembly 42 such that the slot 70 is covered by the sliding plates 73, 74. In an embodiment, brushes or other features may be disposed at ends of the sliding plates 73, 74 and configured to contact the extension 46. This may operate to block material (e.g., dust and debris) from entering the slot 70 while still allowing movement of the movable assembly 42 within the slot 70. In other embodiments, the slot 70 is open such that features within the interior space 48 defined by the lap restraint enclosure 44, described in more detail below, is viewable from an external area 76.

Figure 3:
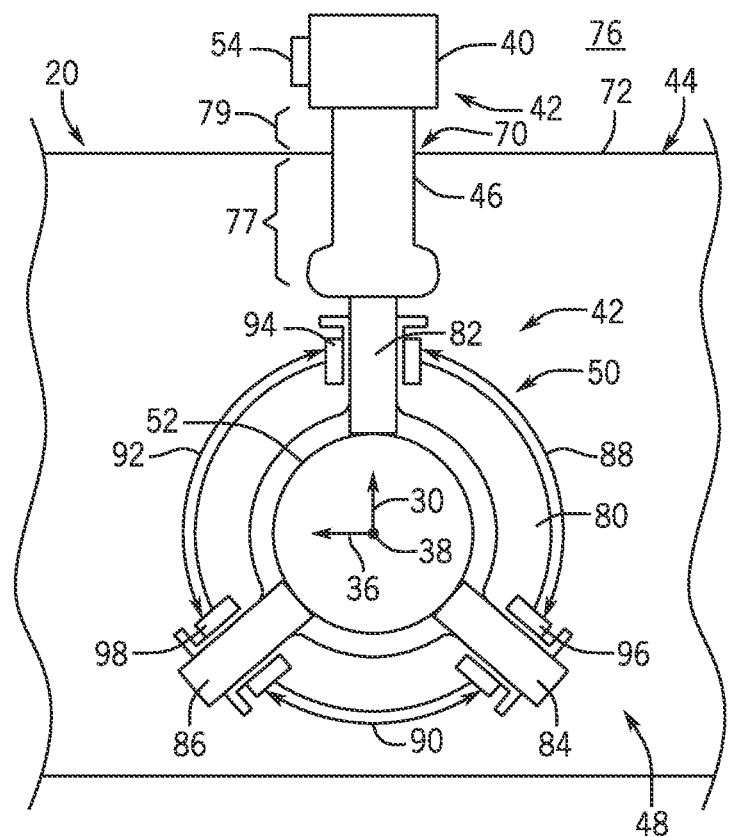
FIG. 3 is a side cross-sectional view of the lap restraint of FIG. 2, taken along line 3-3 in FIG. 2, in accordance with an aspect of the present disclosure.

FIG. 3 is a side cross-sectional view of an embodiment of the lap restraint 20 of FIG. 2, taken along line 3-3 in FIG. 2. As previously described, the lap restraint 20 includes the lap restraint enclosure 44 defining the interior space 48 of the lap restraint 20, the surface 72 of the lap restraint enclosure 44, and the slot 70 (or opening) disposed in the surface 72. The lap restraint 20 also includes the movable assembly 42, which includes the engagement feature 40, the extension 46 coupled to (or having) the engagement feature 40, and the wheel assembly 50. As shown, the extension 46 extends through the slot 70 in the surface 72 of the lap restraint enclosure 44. Thus, the extension 46 includes a first portion 77 within the interior space 48 defined by the lap restraint enclosure 44 and a second portion 79 in the external area 76 outside of the lap restraint enclosure 44. The wheel assembly 50, described in more detail below, is configured to enable the movable assembly 42 to be moved along the track 52 of the lap restraint 20 (e.g., along the third axis 38).

The wheel assembly 50 in the illustrated embodiment includes a ring 80 coupled to the extension 46, and wheels 82, 84, 86 coupled to the ring 80. In some embodiments, the wheels 82, 84, 86 may include bearings (e.g., ball bearings). Further, other low-friction devices may be used and coupled to the ring 80 to facilitate movement along the track 52. As shown, the ring 80 extends entirely around the track 52 such that the ring 80 encircles the track 52. In another embodiment, the ring 80 may include a break at a circumferential position, such as between the second wheel 84 and the third wheel 86, such that the ring 80 does not fully encircle the track 52. Further, while three of the wheels 82, 84, 86 are shown in FIG. 3, any number of wheels may be employed (e.g., six wheels, twelve wheels, etc.). For example, in an embodiment, three additional (e.g., a fourth wheel, a fifth wheel, and a sixth wheel) wheels may be disposed behind or in front of the illustrated wheels 82, 84, 86. That is, the illustrated first wheel 82 and a fourth wheel (behind the first wheel 82) may be disposed at a first circumferential position, the illustrated second wheel 84 and the fifth wheel (behind the second wheel 84) may be disposed at a second circumferential position, and the illustrated third wheel 86 and a sixth wheel (behind the third wheel 86) may be disposed at a third circumferential position.

As shown, the wheels 82, 84, 86 are configured to engage the track 52 and enable movement of the movable assembly 42 along the track 52. In the illustrated embodiment, the first wheel 82 is disposed at a first circumferential position on the ring 80, the second wheel 84 is disposed at a second circumferential position on the ring 80, and the third wheel 86 is disposed at a third circumferential position on the ring 80. The first circumferential position of the first wheel 82 is a first circumferential distance 88 from the second circumferential position of the second wheel 84, the second circumferential position of the second wheel 84 is a second circumferential distance 90 from the third circumferential position of the third wheel 86, and the third circumferential position of the third wheel 86 is a third circumferential distance 92 from the first circumferential position of the first wheel 82. The first circumferential distance 88, the second circumferential distance 90, and the third circumferential distance 92 are substantially equal (e.g., within engineering tolerances) in the illustrated embodiment. The illustrated positions of, and distances 88, 90, 92 between, the wheels 82, 84, 86 of the wheel assembly 50 may improve, relative to traditional systems, a loading of the wheel assembly 50 and movement of the wheel assembly 50 along the track 52. In certain embodiments, distances between the various wheels of the wheel assembly 50 may be different.

In the illustrated embodiment, each of the wheels 82, 84, 86 includes a corresponding locking mechanism 94, 96, 98. The locking mechanisms 94, 96, 98 may be actuated between an unlocked position in which movement of the wheel assembly 50 along the track 52 is permitted and a locked position in which movement of the wheel assembly 50 along the track 52 is blocked. For example, the locking mechanisms 94, 96, 98 may be friction stoppers that contact sides of the respective wheels 82, 84, 86 in the locked position, such that rotation of the respective wheels 82, 84, 86 (and, thus, movement along the track 52) is blocked. In another embodiment, the locking mechanisms 94, 96, 98 (or a single locking mechanism) may include one or more friction stoppers that contact the track 52 directly, thereby blocking movement of the wheel assembly 50 along the track 52.

Figure 4:
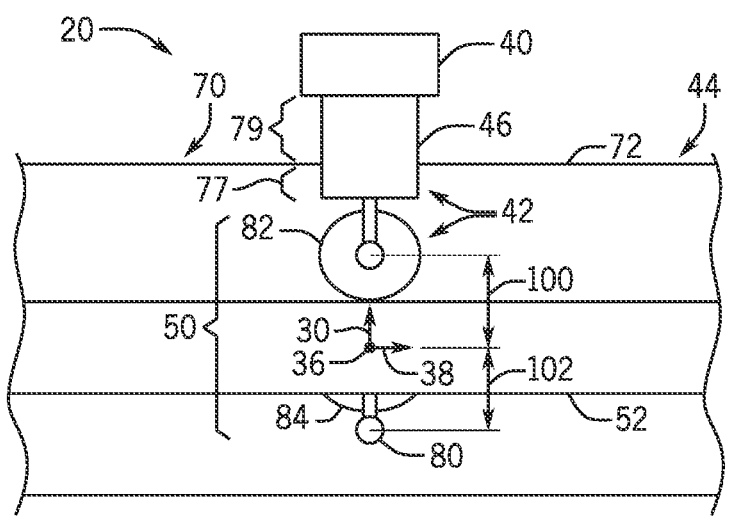
FIG. 4 is a front cross-sectional view of the lap restraint of FIG. 2, taken along line 4-4 in FIG. 2, in accordance with an aspect of the present disclosure.

FIG. 4 is a front cross-sectional view of an embodiment of the lap restraint 20 of FIG. 2, taken along line 4-4 in FIG. 2. As previously described, the lap restraint 20 includes the wheel assembly 50 configured to engage the track 52, move along the track 52, and enable movement of the movable assembly 42 (and, thus, the engagement feature 40 of the lap restraint 20) along the third axis 38. In the illustrated cross-sectional perspective, the wheels 82, 84 of the wheel assembly 50 are shown and the wheel 86 of the wheel assembly 50 is not shown. As previously described, the ring 80 of the wheel assembly 50 is disposed around (e.g., surrounds) the track 52 and may be centered on the track 52 relative to the third axis 38 (e.g., longitudinal axis). For example, as shown, a distance 100 between an upper portion of the ring 80 and the third axis 38 is substantially equal to (e.g., within engineering tolerances) a distance 102 between a lower portion of the ring 80.

Figure 5:
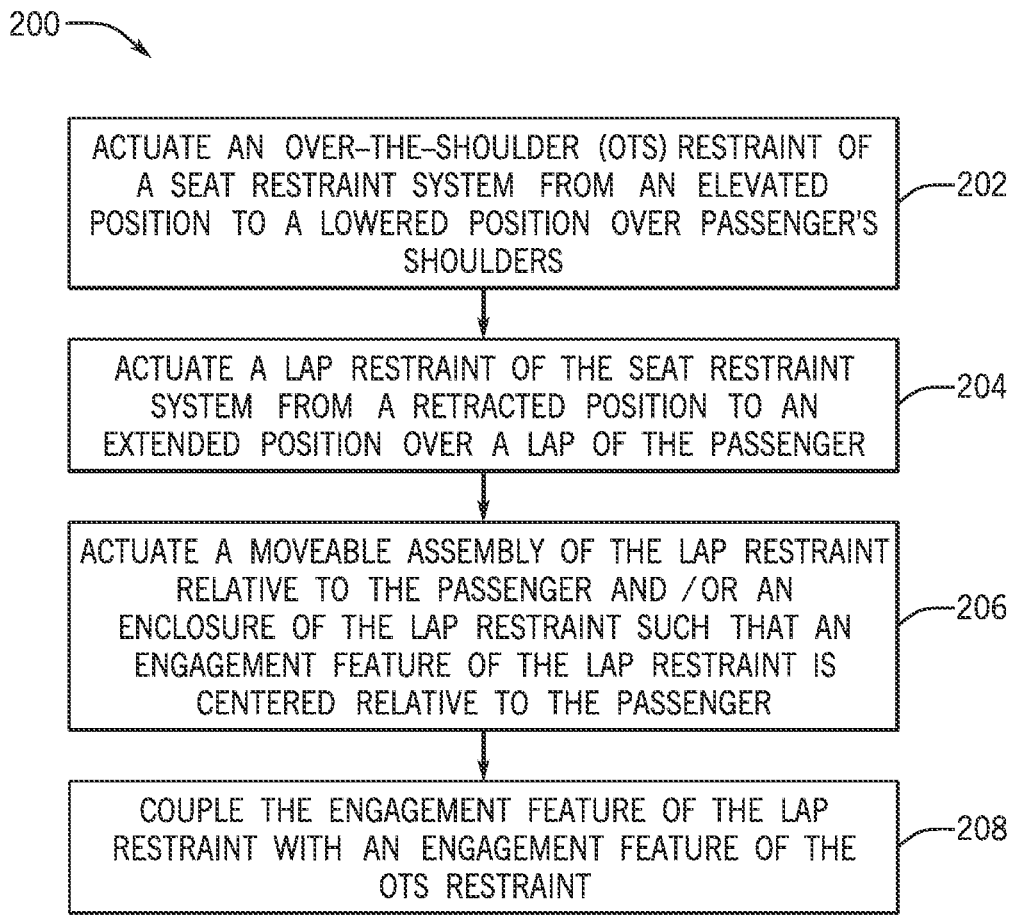
FIG. 5 is a process flow diagram illustrating a method of operating the seat restraint system of FIG. 1, in accordance with an aspect of the present disclosure.

FIG. 5 is a process flow diagram illustrating an embodiment of a method 200 of operating the seat restraint system 16 of FIG. 1. For example, as previously described, the seat restraint system 16 of FIG. 1 may be employed to restrain a passenger within a seat of a ride vehicle. In the illustrated embodiment, the method 200 includes actuating (block 202) an over-the-shoulder (OTS) restraint from an elevated position to a lowered position. That is, the OTS restraint is actuated from the elevated position to the lowered position such that the OTS restraint is disposed over the passenger's shoulders. The OTS restraint may be actuated from the elevated position to the lowered position automatically (e.g., via control features of the ride vehicle) or manually (e.g., by the passenger or an operator of the ride vehicle).

The method 200 also includes actuating (block 204) a lap restraint from an open position (e.g., retracted position or withdrawn position) to an extended position over a lap of the passenger. As previously described, actuation of the lap restraint may be transverse to actuation of the OTS restraint. For example, the lap restraint may be horizontally actuated between the retracted position and the extended position, and the OTS restraint may be vertically actuated between the elevated position and the lowered position. Additionally or alternatively, the lap restraint may be actuated in a direction or a plane extending transverse to an additional direction or additional plane defining actuation of the OTS restraint. The lap restraint may be actuated from the retracted position to the extended position automatically (e.g., via the control features of the ride vehicle) or manually (e.g., by the passenger or the operator of the ride vehicle).

The method 200 also includes actuating (block 206) a movable assembly of the lap restraint relative to the passenger and/or an enclosure of the lap restraint such that an engagement feature of the lap restraint is generally centered relative to the passenger. For example, as previously described, the lap restraint may include a track and a movable assembly that is movable along the track. The engagement feature of the lap restraint may be attached to (or form a part of) the movable assembly. Thus, the movable assembly can be moved (e.g., via the passenger or the operator of the ride vehicle) such that the engagement feature is generally centered relative to the passenger.

The method 200 also includes coupling (block 208) the engagement feature of the lap restraint with an engagement feature of the OTS restraint. As previously described, the engagement features may include a buckle and a latch, or any other suitable engagement feature configured to couple the lap restraint and the OTS restraint. Coupling or mating of the engagement features of the lap restraint and the OTS restraint may be permitted when the lap restraint is in the extended position and the OTS restraint is in the lowered position.

The above-described systems and methods facilitate a centering of an engagement feature of a lap restraint employed in a ride vehicle, such that the engagement feature can be coupled to a corresponding engagement feature of an over-the-shoulder (OTS) restraint. The presently disclosed embodiments improve a comfort, ease of operation, ease of manufacture, and cost of seat restraint systems relative to traditional embodiments, among other technical benefits.

While only certain features have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A lap restraint of a seat restraint system, the lap restraint comprising:
   a lap restraint enclosure defining an interior space and having a slot through a surface of the lap restraint enclosure;
   a track disposed in the interior space;
   a movable assembly engaged with the track and configured to move along the track; and
   an extension of the movable assembly, wherein the extension extends from the interior space, through the slot in the surface of the lap restraint enclosure, and to an external space outside of the lap restraint enclosure; and
   an engagement feature of the movable assembly, wherein the engagement feature is coupled to the extension and configured to be coupled to an over-the-shoulder (OTS) restraint of the seat restraint system.

2. The lap restraint of claim 1, wherein the movable assembly comprises:
   a ring coupled to the extension and disposed in the interior space about the track; and
   a plurality of wheels coupled to the ring and engaged with the track.

3. The lap restraint of claim 2, wherein the plurality of wheels comprises:
   a first wheel coupled to the ring at a first circumferential position;
   a second wheel coupled to the ring at a second circumferential position spaced from the first circumferential position by a first circumferential distance; and
   a third wheel coupled to the ring at a third circumferential position spaced from the second circumferential position by a second circumferential distance and spaced from the first circumferential position by a third circumferential distance, wherein the first circumferential distance, the second circumferential distance, and the third circumferential distance are substantially equal.

4. The lap restraint of claim 1, wherein the engagement feature comprises a buckle or a latch.

5. The lap restraint of claim 1, wherein the lap restraint enclosure is configured to be actuated between:
   a retracted position in which a coupling between the engagement feature of the lap restraint and the OTS restraint is blocked; and
   an extended position in which the coupling between the engagement feature of the lap restraint and the OTS restraint is permitted.

6. The lap restraint of claim 1, comprising a locking mechanism configured to be actuated between:
   a locked position in which the movable assembly is locked in place relative to the track; and
   an unlocked position in which the movable assembly is movable along the track.

7. A seat restraint system, comprising:
an over-the-shoulder (OTS) restraint; and
a lap restraint, comprising:
- a lap restraint enclosure defining an interior space and having an opening through the lap restraint enclosure;
- a track disposed in the interior space;
- a movable assembly engaged with the track and configured to move along the track;
- an extension of the movable assembly, wherein the extension extends from the interior space, through the opening, and to an external space outside of the lap restraint enclosure; and
- an engagement feature of the movable assembly, wherein the engagement feature is coupled to the extension and configured to be coupled to the OTS restraint in an engaged configuration.

8. The seat restraint system of claim 7, wherein the movable assembly comprises:
- a ring coupled to the extension and disposed in the interior space and circumferentially about the track; and
- a plurality of wheels coupled to the ring and engaged with the track.

9. The seat restraint system of claim 8, wherein the plurality of wheels comprises:
- a first wheel coupled to the ring at a first circumferential position;
- a second wheel coupled to the ring at a second circumferential position spaced from the first circumferential position by a first circumferential distance; and
- a third wheel coupled to the ring at a third circumferential position spaced from the second circumferential position by a second circumferential distance and spaced from the first circumferential position by a third circumferential distance, wherein the first circumferential distance, the second circumferential distance, and the third circumferential distance are substantially equal.

10. The seat restraint system of claim 9, wherein the plurality of wheels comprises:
- a fourth wheel coupled to the ring at the first circumferential position;
- a fifth wheel coupled to the ring at the second circumferential position; and
- a sixth wheel coupled to the ring at the third circumferential position.

11. The seat restraint system of claim 7, comprising:
a latch of the engagement feature; and
a buckle coupled to the OTS restraint, wherein the latch and the buckle are configured to mate such that the lap restraint is coupled to the OTS restraint in the engaged configuration.

12. The seat restraint system of claim 7, comprising:
a buckle of the engagement feature; and
a latch coupled to the OTS restraint, wherein the buckle and the latch are configured to mate such that the lap restraint is coupled to the OTS restraint in the engaged configuration.

13. The seat restraint system of claim 7, wherein:
the OTS restraint is configured to be vertically actuated between a first position in which the OTS restraint is lowered toward the lap restraint and a second position in which the OTS restraint is elevated away from the first position; and
the lap restraint is configured to be horizontally actuated between a third position in which the lap restraint is engagable with the OTS restraint and a fourth position in which the lap restraint is retracted from the third position.

14. The seat restraint system of claim 7, wherein the OTS restraint comprises:
a first member; and
a second member spaced from the first member by a distance compatible with receiving a head of a passenger between the first member and the second member.

15. The seat restraint system of claim 14, wherein:
the OTS restraint comprises a plate coupled to the first member and the second member; and
the plate is configured to engage the engagement feature of the lap restraint to couple the lap restraint with the OTS restraint in the engaged configuration.

16. The seat restraint system of claim 7, comprising a locking mechanism configured to be actuated between:
- a locked position in which the movable assembly is locked in place on the track; and
- an unlocked position in which movement of the movable assembly along the track is permitted.

17. A ride vehicle, comprising:
a seat configured to receive a passenger;
an over-the-shoulder (OTS) restraint configured to be actuated relative to the seat; and
a lap restraint configured to be actuated relative to the seat, wherein the lap restraint comprises:
- a track;
- a movable assembly engaged with the track and configured to move along the track; and
- an extension coupled to the movable assembly and having an engagement feature configured to:
  - couple with the OTS restraint; and
  - decouple from the OTS restraint.

18. The ride vehicle of claim 17, wherein:
the lap restraint comprises a lap restraint enclosure defining an interior space in which the track, the movable assembly, and a first portion of the extension are disposed;
the lap restraint enclosure comprises a surface having a slot extending therethrough; and
the extension extends through the slot such that a second portion of the extension is disposed in an external space outside of the lap restraint enclosure, wherein the second portion includes the engagement feature.

19. The ride vehicle of claim 17, wherein the movable assembly comprises:
a ring disposed about the track; and
a plurality of wheels coupled to the ring and engaged with the track.

20. The ride vehicle of claim 17, wherein the engagement feature comprises a buckle or a latch.

\* \* \* \* \*